United States Patent [19]
Kato

[11] Patent Number: 5,216,996
[45] Date of Patent: Jun. 8, 1993

[54] AUXILIARY STRUCTURE AND ARRANGEMENT FOR INTERNAL COMBUSTION ENGINE

[75] Inventor: Naoki Kato, Hamamatsu, Japan

[73] Assignee: Yamaha Hatsudoki Kabushiki Kaisha, Iwata, Japan

[21] Appl. No.: 857,488

[22] Filed: Mar. 25, 1992

[30] Foreign Application Priority Data

Mar. 25, 1991 [JP] Japan .................................. 3-83061

[51] Int. Cl.⁵ .................................................. F02M 23/00
[52] U.S. Cl. .................................................. 123/533
[58] Field of Search ............... 123/533, 531, 532, 534, 123/535, 179.25, 179.28, 179.29; 440/76, 77, 111, 113

[56] References Cited

U.S. PATENT DOCUMENTS

| | | | |
|---|---|---|---|
| 1,388,540 | 8/1921 | Wise | 123/179.28 |
| 1,887,902 | 11/1932 | Garelli | 123/179.29 |
| 3,517,504 | 6/1970 | Sakamoto | 123/533 |
| 4,674,462 | 6/1987 | Koch et al. | 123/533 |
| 4,689,025 | 8/1987 | Ferguson | 440/61 |
| 5,041,034 | 8/1991 | Sakamoto | 440/76 |
| 5,052,234 | 10/1991 | Sugiyama | 123/179.25 |
| 5,054,457 | 10/1991 | Sakamoto | 123/533 |
| 5,069,189 | 12/1991 | Saito | 123/533 |
| 5,072,704 | 12/1991 | Webb | 123/179.1 |
| 5,086,746 | 2/1992 | Albertson | 123/533 |

Primary Examiner—Raymond A. Nelli
Attorney, Agent, or Firm—Ernest A. Beutler

[57] ABSTRACT

A fuel injection system for an in-line multi-cylinder internal combustion engine that comprises a injector rail, a fuel supplying unit for delivering fuel to the injector rail and which includes a high pressure fuel pump, a pressure regulator and a vapor separator installed as a unit on the same side of the engine as the exhaust ports for the cylinders. The fuel injection system further comprises an air compressor for delivering air to the injector rail and which is installed as a unit with a generator on the side of the engine opposite the fuel supplying unit. The compressor is positioned above the generator which has a larger diameter than the compressor, and these two components are provided with a common drive shaft that is drivingly connected to the crankshaft of the engine for rotation.

15 Claims, 4 Drawing Sheets

AUXILIARY STRUCTURE AND ARRANGEMENT FOR INTERNAL COMBUSTION ENGINE

BACKGROUND OF THE INVENTION

This invention relates to an auxiliary structure and arrangement for an in-line multi-cylinder internal combustion engine, and more particularly to a structural arrangement wherein the auxiliaries of the engine, such as the auxiliaries of a fuel injection system, are disposed in close proximity to the engine so as to provide a compact and effective arrangement.

The advantages of providing internal combustion engines with direct cylinder fuel injection are well recognized. Such direct injection has the advantage of insuring more accurate control of the fuel supply and a better control of the exhaust gas emissions from such engines. In-cylinder fuel injection has been used instead of carburetion to mix the fuel in four-cycle engines, whereas in two-cycle crankcase compression engines, direct fuel injectors have been employed along with a carburetor system. When employed together, the injectors supply fuel directly to the combustion chambers, while the carburetor system supplies a fuel/air mixture to the crankcase chambers which may also serve to cool the pistons under high speed running conditions.

The in-cylinder fuel injection system typically includes an injector device that atomizes the fuel and supplies it along with the compressed air to the combustion chambers of the cylinders. This type of fuel injection system has also been equipped with various auxiliary components such as a compressor for supplying compressed air to the fuel/air injector as well as a high pressure fuel pump and pressure regulator for supplying pressure regulated fuel to the fuel/air injector. A generator, driven by the engine crankshaft is also provided for producing the electrical energy to operate to the system. Although this type of fuel injection system is very effective in controlling and metering the fuel supply to the engine, it can present a problem as to space depending on its application. This is particularly true in outboard motors where it is desireable to limit the amount of space occupied by the engine and its associated components so that the outboard motor, and in particular the power head wherein the engine is contained, can be made compact.

It is therefore desireable in outboard motors to position the auxiliary components of a fuel injection system in close proximity to the engine to reduce the amount of parts needed and to provide a more compact power head. To this end, it has been proposed in connection with an outboard motor incorporating a V-type internal combustion engine to position the auxiliaries in the valley of the V and to position the air compressor and generator close to one another with a common driving shaft. See Japanese Unexamined Patent Publication Hei2-141392. By positioning the auxiliary components in the valley between the cylinders, these components may be located relatively close to the engine without increasing the outer dimensions of the power head.

However, there still remains a problem of how to position the larger auxiliaries, such as the compressor and the generator, relative to an in-line engine which has no valley, so as to minimize the space required for the engine and its auxiliary components. There has also been a problem with respect to the positioning of the high pressure fuel system auxiliaries, such as the high pressure pump, with respect to an in-line engine so as to provide a compact and effective arrangement.

It is, therefore, a principal object of this invention to provide an auxiliary system for an in-line multi-cylinder internal combustion engine which includes a plurality of auxiliary units, one positioned in close proximity to the engine on the side opposite the engine exhaust ports and the other positioned in close proximity to a corner of the engine to minimize the space required for the engine and its associated components.

It is another object of this invention to provide an improved structural arrangement for an in-line multi-cylinder internal combustion engine which employs direct cylinder injection, wherein the auxiliaries of the fuel injection system are disposed in close proximity to the engine to provide a compact and effective arrangement.

SUMMARY OF THE INVENTION

This invention is adapted to be embodied in an auxiliary system for an in-line multi-cylinder internal combustion engine having exhaust ports. The system comprises a first auxiliary unit, preferably comprising a compressor for supplying air to an injector device that injects fuel and air into the cylinders of the engine, positioned on the side of the engine opposite the exhaust ports. The system further comprises a second auxiliary unit which preferably includes means for supplying fuel to the injector device and which is positioned in close proximity to a corner of the engine.

DETAILED DESCRIPTION OF THE PREFERRED EMBODIMENTS OF THE INVENTION

Figure 1:
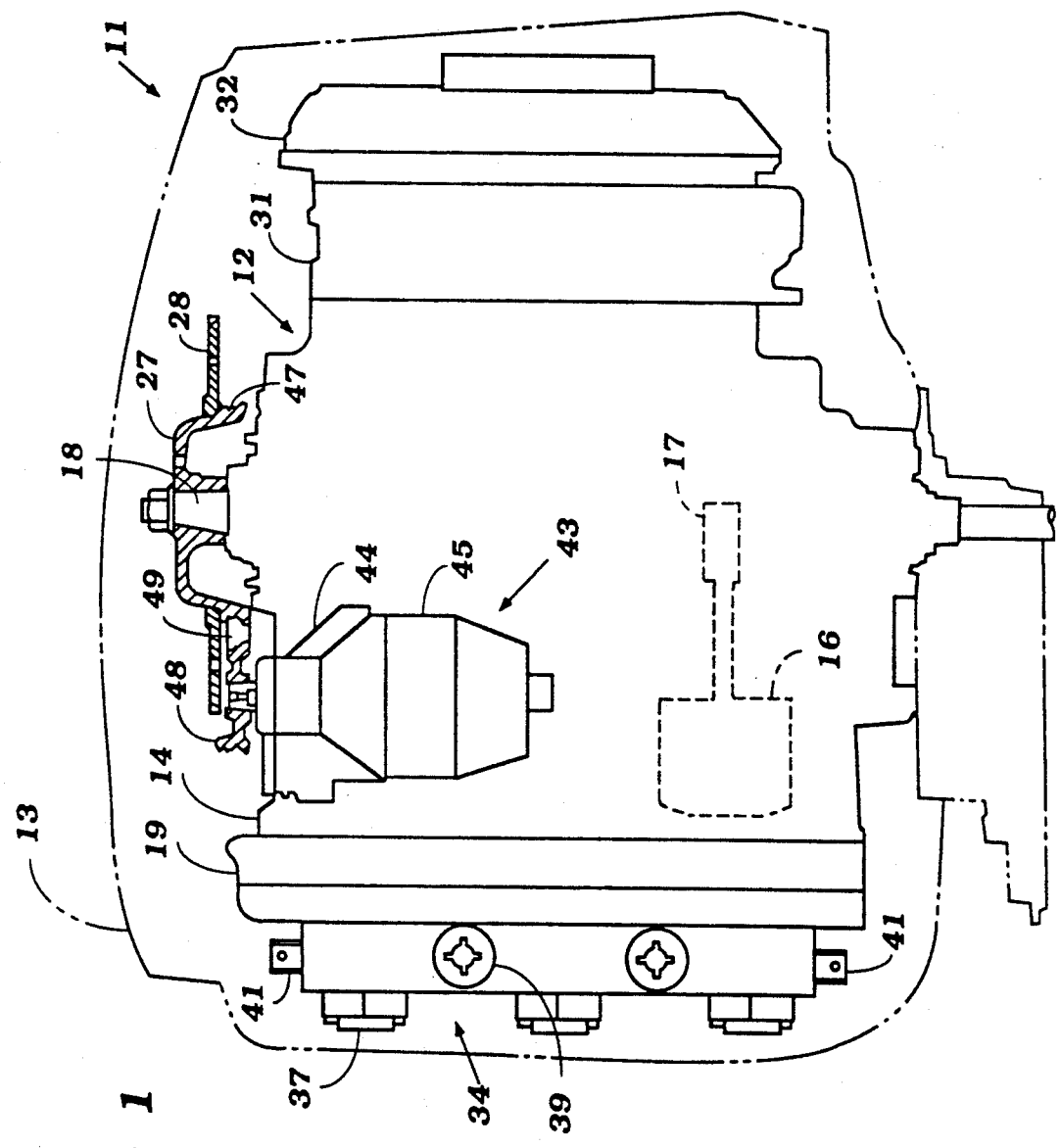
FIG. 1 is a side elevational view of the power head of an outboard motor constructed in accordance with an embodiment of the invention, with the protective cowling shown in phantom and portions of the engine shown in cross section.
Figure 2:
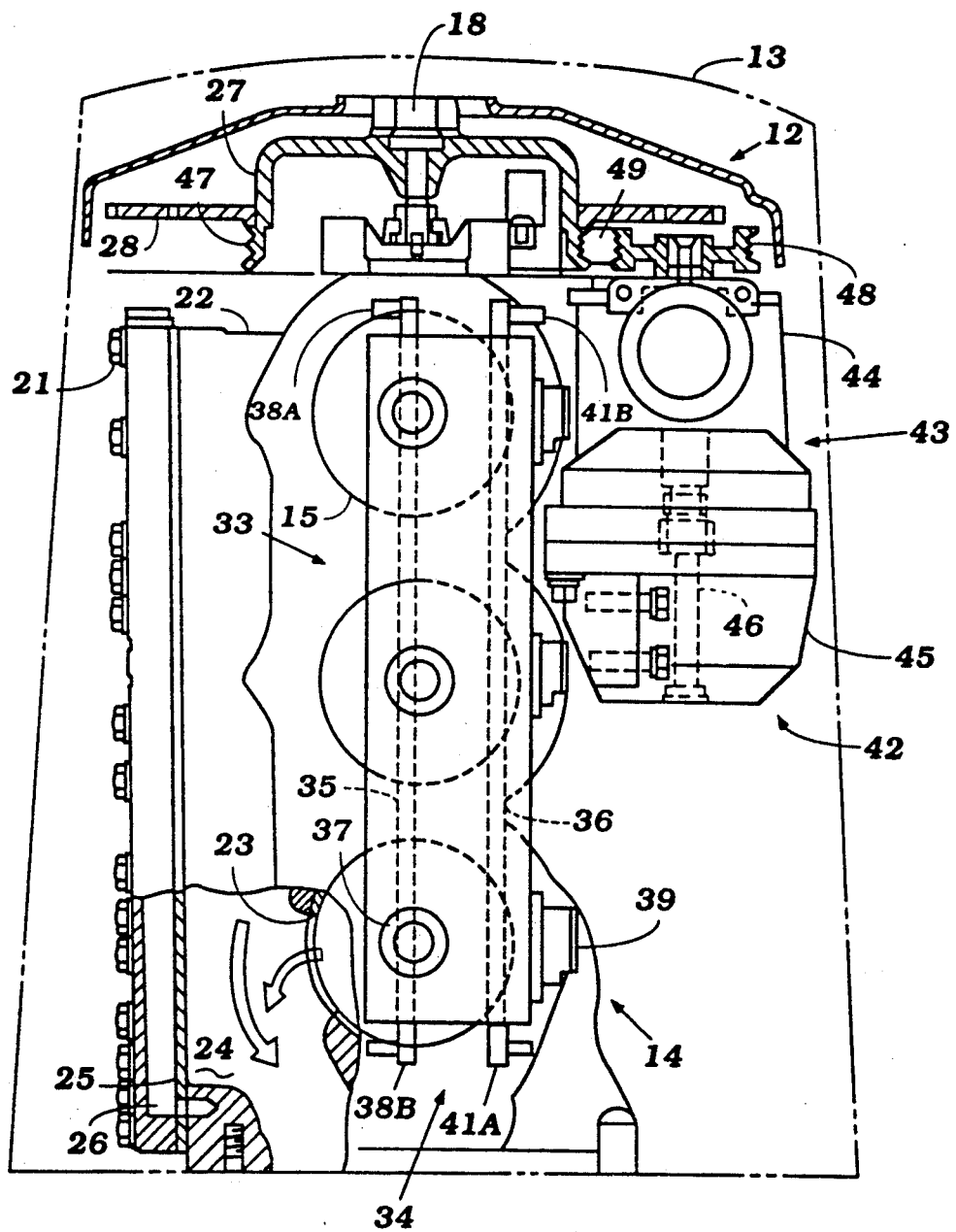
FIG. 2 is a rear elevational view of the power head, with a portion of the engine broken away and other portions shown in cross section.

Referring now in detail to the drawings and initially to FIGS. 1 and 2, the power head of an outboard motor constructed in accordance with an embodiment of the invention is identified generally by the reference numeral 11. The invention is described in conjunction with an outboard motor since it has particular utility in connection with outboard motors. This is particularly true since the invention, or at least certain aspects of it, have particular utility with two-cycle crankcase compression internal combustion engines which are popularly employed as the power source of outboard motors. It is to be understood by those skilled in the art, however, that the invention can be utilized in conjunction with applications other than outboard motors and that certain facets of the invention have application in engines other than the two-cycle crankcase compression type.

The engine of the power head 11 is identified generally by the reference numeral 12 and is surrounded by a protective cowling, which is shown in phantom and which is identified by the reference numeral 13. The engine 12 is, in the illustrated embodiment, of the in-line, three cylinder, two-cycle, crankcase compression type, although it will be apparent to those skilled in the art that the invention can be applied to engines having other cylinder configurations or a different number of cylinders or to engines other than the reciprocating type.

The engine 12 includes a cylinder block 14 and has three generally horizontally disposed cylinder bores 15 formed therein. Pistons 16 reciprocate in these cylinder bores 15 and are connected by means of connecting rods 17 to a crankshaft 18 which is rotatably journaled about a generally vertically extending axis, as is conventional with outboard motor practice. A cylinder head 19 is affixed to the cylinder block 14 in a known manner and has individual combustion recesses that cooperate with the cylinder bores 15 and pistons 16 to provide variable volume chambers, sometimes referred to as combustion chambers.

Fastened on the cylinder block 14 by means of bolts 21 is a cylinder block cover 22 which has a plurality of exhaust ports 23 formed therein, one for each cylinder 15. Outside of the exhaust ports 23 is an exhaust passage 24 which is formed in the cylinder block cover 22 and through which the exhaust from the cylinders 15 is carried to the exhaust system (not shown). A cover plate 25 is interposed between the cylinder block cover 22 and a water jacket 26 which is used for cooling the engine 12.

The engine 12 drives a magneto generator assembly which includes a rotor 27 that is affixed to the top end of the crankshaft 18 and a flywheel 28 that is affixed on the outer periphery of the rotor 27. An electric starter (not shown) is mounted within the protective cowling 13 and has a starter gear that is adapted to engage corresponding gear teeth formed on the flywheel 28 for starting the engine 12 in a known manner.

The engine 12 is provided with a charge forming system for supplying a charge to individually sealed crankcase chambers of the engine 12 for eventual delivery to the combustion chambers through a plurality of scavenge or transfer passages. This charge forming system includes a carburetor 31 that receives an air charge from an air intake device 32 which draws in air from the area within the protective cowling 13. This air charge is mixed with an incoming fuel charge supplied to the carburetor 31, and the fuel/air charge formed by the carburetor 31 is then delivered to the crankcase chambers through a manifold system in which reed type check valves are provided so as to preclude reverse flow through the manifold and carburetor 31, as is well known in this art.

In addition to the carburetor charge forming system, the engine 12 is also provided with a fuel injection system, indicated generally by the reference numeral 33. This fuel injection system 33 includes an injector rail 34 that is mounted on the cylinder head 19 and which has both an air and fuel passage line, 35 and 36 respectively, extending over each cylinder 15. The air passage 35 is provided with a plurality of high pressure air injectors 37, one associated with each cylinder 15, and has attached to it an air nipple 38A through which compressed air is supplied and an air nipple 38B through which the remaining compressed air is delivered to an air pressure regulator (not shown). Similarly, the fuel passage 36 has a fuel nipple 41A through which fuel enters the fuel passage 36 for delivery to fuel injector nozzles 39, one for each cylinder 15, and a fuel nipple 41B through which the remaining fuel flows to a pressure regulator 53.

On the side of the engine 12 opposite the exhaust ports 23 and toward the rear of the cylinder block 14 between the engine 12 and the cowling 13 is a space, identified generally by the reference numeral 42. In this space 42, is an auxiliary unit, identified generally by the reference numeral 43, of the fuel injection system 33 that is comprised of an air compressor 44 and a generator 45 positioned below the compressor 44. The compressor 44 and generator 45 are provided with a common drive shaft 46 that extends in a generally vertical direction through both components 44 and 45. The diameter of the generator 45 is larger than the diameter of the compressor 44 and the auxiliary unit 43 is disposed so that the maximum diameter portion of the generator 45 extends into a cavity portion between two of the cylinders 15.

The drive shaft 46 is driven by the engine crankshaft 18 through a belt and pulley system that includes a drive pulley 47 which is formed on the lower portion of the rotor 27 and is driven by the crankshaft 18. This drive pulley 47, in turn, drives a driven pulley 48 formed on the top portion of the drive shaft 46 through a belt 49.

Figure 3:
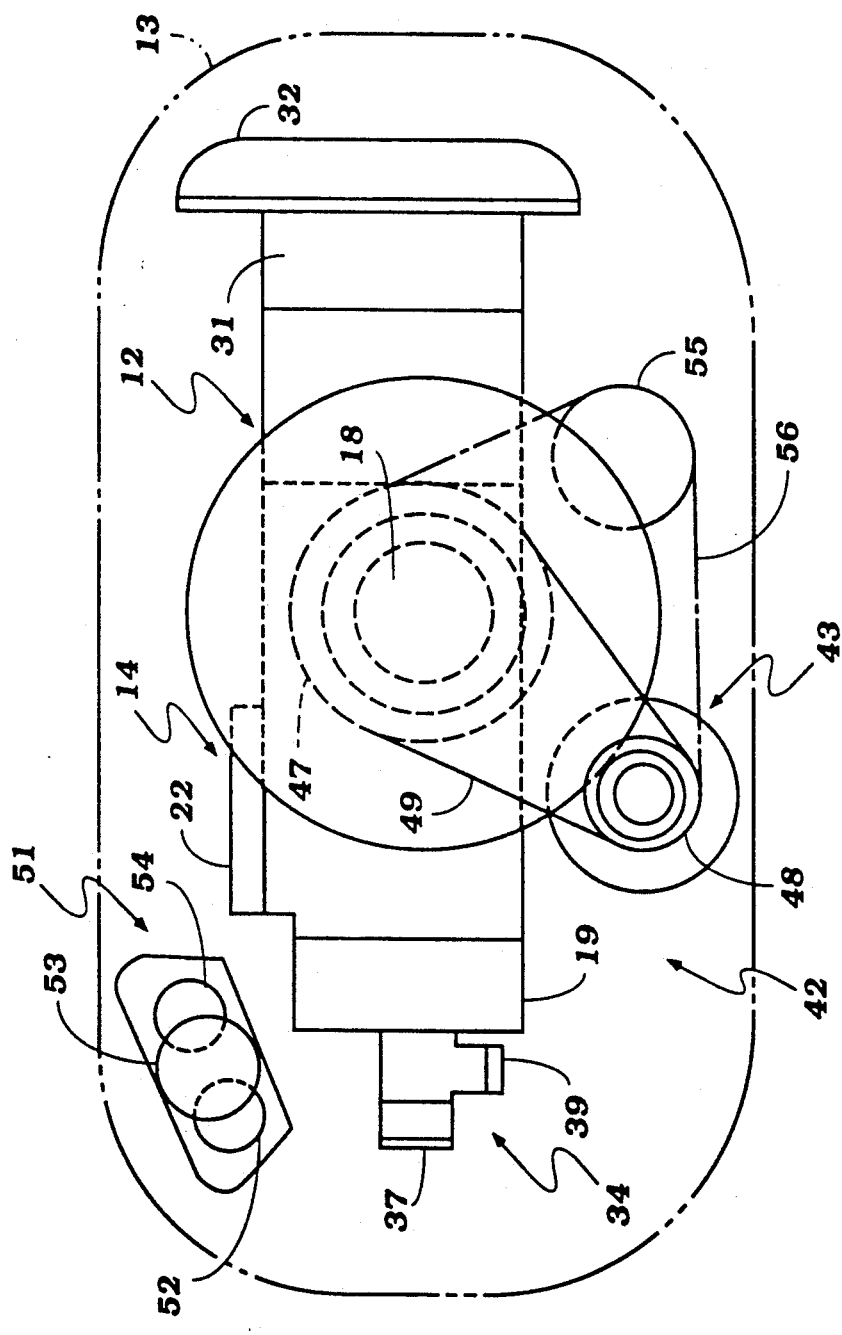
FIG. 3 is a top plan view of the power head, with the protective cowling shown in phantom.
Figure 4:
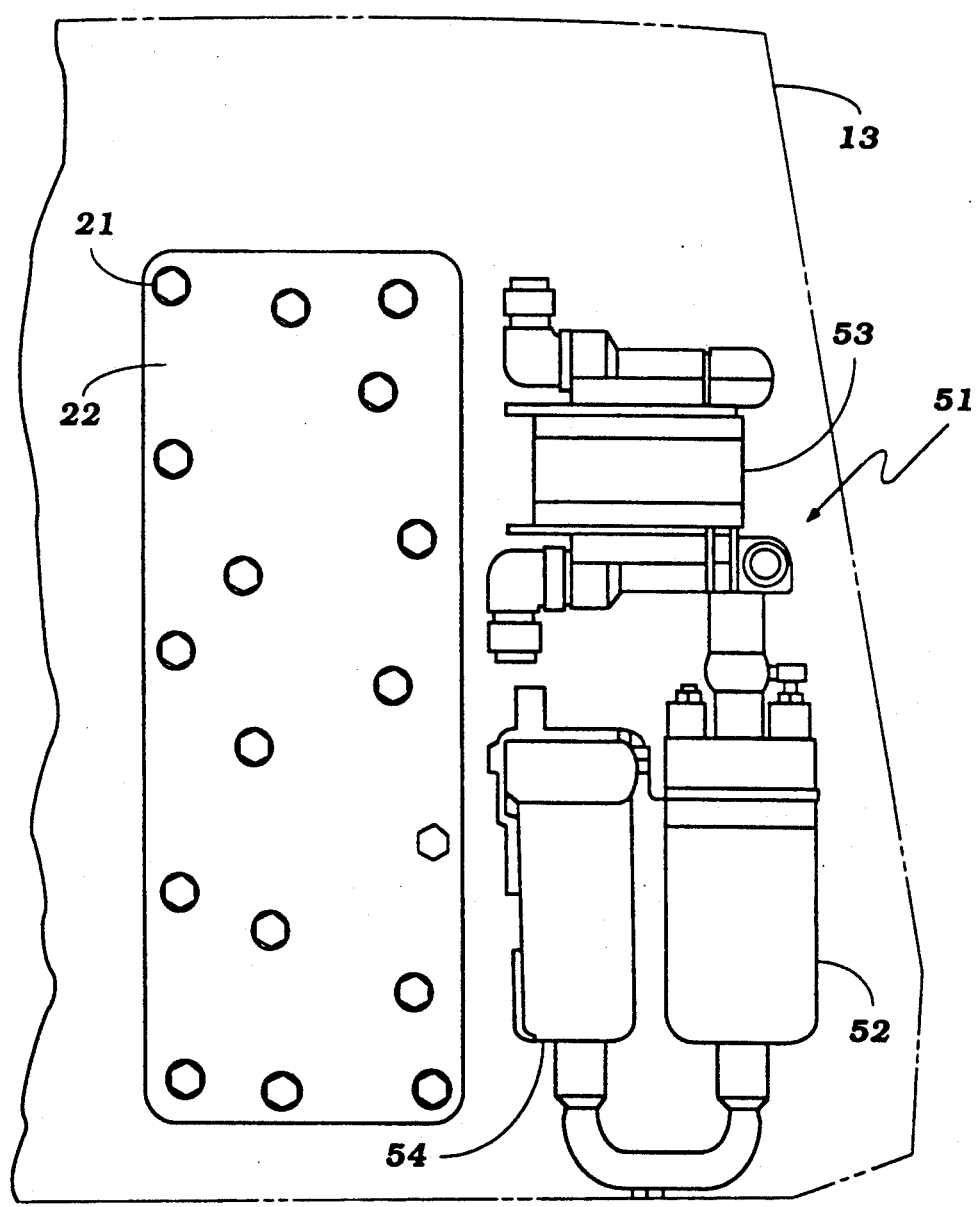
FIG. 4 is a partial side view of the power head of the outboard motor showing the cylinder block cover.

Referring now to FIGS. 3 and 4, the fuel injection system further includes a second group of auxiliaries, identified generally by the reference numeral 51 and installed as a unit and positioned in close proximity to a corner of the engine 12. In the illustrated embodiment, the second auxiliary unit 51 is positioned near the rear corner of the engine 12 on the side of the engine 12 opposite the auxiliary unit 43 in the space between the cylinder head 19 and the cowling 13 near one side of the injector rail 34. This fuel auxiliary unit 51 is comprised of a high pressure fuel pump 52, the pressure regulator 53 and a vapor separator 54 for removing bubbles from the fuel.

In operation, fuel is delivered from the high pressure pump 52 through the pressure regulator 53 and vapor separator 54 to the fuel injection nozzles 39 through the fuel nipple 41A and the fuel passage 36 while, at the same time, compressed air from the compressor 44 is delivered to the air injection nozzles 37 through the air nipple 38A and the air passage 35 for injecting a fuel/air charge into each combustion chamber.

By placing the auxiliary unit 43 on the side of the engine opposite the exhaust ports 23 and the cylinder block cover 22, the air compressor 44 and generator 45 can be disposed closer to the crankshaft 18 making the engine 12 more compact. The engine 12 can be made even more compact and the auxiliary unit 43 disposed even closer to the crankshaft 18 when the maximum diameter portion of the generator 45 is positioned in the cavity between two of the cylinders 15, as shown in FIG. 2. Moreover, when the auxiliary unit 43 is mounted in this manner in close proximity to the crankshaft 18, less of a twisting load is imposed on the crankshaft 18 which can increase the life of the engine 12.

Another advantage of placing the compressor 44 and generator 45 close to the engine 12 is that the piping for delivering the compressed air from the compressor 44 to the air passage 35 can be made shorter. This, in turn, will increase the rate of pressure rise in the system at the start of the engine 12 to make the starting of the engine 12 easier and more sure.

The second auxiliary unit 51 for the fuel is also positioned so as to insure a compact and effective power head arrangement. As shown in FIG. 3, the auxiliary unit 51 is positioned at the rearward corner of the engine 12 on the other side of the engine 12 from the auxiliary unit 43. Alternatively, the auxiliary unit 51 may be positioned at the other rearward corner on the same side of the engine 12 as auxiliary unit 43. In either case, the fuel pump 52, pressure regulator 53 and vapor separator 54 are positioned as a unit in unit 51 and in close proximity to the cylinder head 19 and fuel passage 36. This allows shorter piping to be used for supplying fuel from the fuel auxiliary unit 51 to the fuel passage 36, thereby eliminating the need for relatively long exposed piping. This also improves engine starting since fuel pressure can be brought up faster with the shorter piping.

In the illustrated embodiment, the power for running the generator 45 is taken off from the engine crankshaft 18 through the belt 49 at the lower portion of the rotor 27. This also acts to reduce the twist imposed on the crankshaft 18 and improve the life span of the engine 12, as compared to an arrangement where the drive pulley 47 is formed on the upper portion of the rotor 27 closer to the top of the crankshaft 18. Also, by using a single belt 49 to run both the compressor 44 and generator 45 off of the lower part of the rotor 27, the number of drive pulleys can be reduced. This will also serve to make the engine 12 more compact.

In another embodiment of the invention, the engine 12 may also be used as a power source for driving external equipment, such as fishing equipment. For example, a hydraulic take out pump 55 may be disposed forwardly of, and on the same side of the engine 12 as, the auxiliary unit 43, as shown in FIG. 3. In this case, a single belt 56 may be used to drive both the auxiliary unit 43 and the pump 55 from the crankshaft 18.

It should be readily apparent from the foregoing description that a very compact and effective arrangement for an in-line multi-cylinder engine having a fuel injection system 33 has been illustrated and described. By placing the fuel injection auxiliary units 43 and 51 in specified locations relative to the engine 12, a more compact arrangement is achieved which allows the engine 12 and the fuel injection system 33 to be readily disposed within the relatively limited space available within the cowling 14 while still leaving room for other components, such as the engine control system, oil tank, etc. Since the power head is kept compact in the width dimension, such an arrangement is also very effective for a twin outboard motor system. Although embodiments of the invention have been illustrated and described, various changes and modifications may be made without departing from the spirit and scope of the invention, as defined by the appended claims. For example, this arrangement is not limited to only fuel injection auxiliaries but may also be applied to other types of auxiliaries that may be associated with an internal combustion engine.

I claim:

1. An auxiliary system for an in-line multi-cylinder internal combustion engine having exhaust ports and an injector device for injecting fuel and air into the cylinders of the engine comprising a compressor for supplying air to said fuel and air injector device and positioned on the side of the engine opposite the exhaust ports and means for supplying fuel to said fuel and air injector device positioned in close proximity to one end of the other side of the engine.

2. An auxiliary system as recited in claim 1, wherein said fuel supplying means comprises a high pressure fuel pump and a regulator for regulating the pressure of the fuel supplied to said fuel and air injector device by said pump.

3. An auxiliary system as recited in claim 2, wherein said fuel supplying means further comprises a vapor separator downstream of said pump.

4. An auxiliary system as recited in claim 2, wherein said fuel pump and regulator are installed as a unit.

5. An auxiliary system as recited in claim 3, wherein said fuel pump, regulator and vapor separator are installed as a unit.

6. An auxiliary system as recited in claim 1, wherein said compressor for supplying air to said fuel and air injector device further comprises a generator installed as unit with said compressor.

7. An auxiliary system as recited in claim 4, wherein said compressor for supplying air to said fuel and air injector device further comprises a generator installed as unit with said compressor.

8. An auxiliary system as recited in claim 1, wherein said fuel supplying means and said compressor are positioned on the same side of the engine.

9. An auxiliary system as recited in claim 1, wherein said fuel supplying means comprises a high pressure fuel pump, a regulator for regulating the pressure of the fuel supplied to said fuel and air injector device by said pump and a vapor separator downstream of said pump, and wherein said pump, regulator and vapor separator are installed as a unit.

10. An auxiliary system as recited in claim 9, wherein said compressor for supplying air to said fuel and air injector device further comprises a generator installed as a unit with said compressor.

11. An auxiliary system as recited in claim 10, wherein said generator and compressor have a common drive shaft and wherein said compressor for supplying air to said fuel and air injector device is positioned so that a portion of the generator extends into a cavity portion formed between two of the cylinders of the engine.

12. An auxiliary system as recited in claim 11, wherein said means for supplying fuel to said fuel and air injector device is positioned in close proximity to a rearward corner of the engine on the side of the engine opposite said compressor for supplying air to said fuel and air injector device.

13. An auxiliary system as recited in claim 11, wherein said means for supplying fuel to said fuel and air injector device is positioned in close proximity to a rearward corner of the engine on the same side of the engine as said compressor for supplying air to said fuel and air injector device.

14. An auxiliary system as recited in claim 11, further comprising a belt and wherein the engine includes a crankshaft having a first pulley and said drive shaft has a second pulley driven by said first pulley through said belt.

15. An auxiliary system as recited in claim 11, wherein said generator is positioned below said compressor and said compressor for supplying air to said fuel and air injector device is positioned so that the maximum diameter portion of the generator extends into a cavity portion formed between two of the cylinders of the engine.

* * * * *